United States Patent
Zhu et al.

(10) Patent No.: US 12,453,884 B1
(45) Date of Patent: Oct. 28, 2025

(54) ROTATING RESISTANCE DEVICE AND A TENSION DEVICE

(71) Applicants: Zhejiang Todo Hardware Manufacture Co., Ltd., Jinhua (CN); Qin Wang, Jinhua (CN)

(72) Inventors: Yong Zhu, Jinhua (CN); Qin Wang, Jinhua (CN); Shunjun Meng, Jinhua (CN); Peng Lu, Jinhua (CN)

(73) Assignees: Zhejiang Todo Hardware Manufacture Co., Ltd., Jinhua (CN); Qin Wang, Jinhua (CN)

( * ) Notice: Subject to any disclaimer, the term of this patent is extended or adjusted under 35 U.S.C. 154(b) by 0 days.

(21) Appl. No.: 19/023,970

(22) Filed: Jan. 16, 2025

(30) Foreign Application Priority Data

Dec. 26, 2024 (CN) .......................... 202411948224.5

(51) Int. Cl.
*A63B 21/22* (2006.01)
*A63B 21/00* (2006.01)

(52) U.S. Cl.
CPC ........ *A63B 21/22* (2013.01); *A63B 21/00058* (2013.01)

(58) Field of Classification Search
CPC . A63B 21/157; A63B 21/153; A63B 24/0062; A63B 21/22; A63B 2220/803; A63B 2209/08; A63B 2220/833; A63B 21/00058

See application file for complete search history.

(56) References Cited

U.S. PATENT DOCUMENTS

| | | | | |
|---|---|---|---|---|
| 5,409,435 A | * | 4/1995 | Daniels | F16D 57/002 482/901 |
| 6,488,611 B1 | * | 12/2002 | Ambrosina | A63B 21/008 482/53 |
| 10,512,812 B2 | * | 12/2019 | Krull | A63B 21/4043 |
| 11,298,579 B2 | * | 4/2022 | Kao | A63B 21/157 |
| 2014/0200120 A1 | * | 7/2014 | Gallagher | A63B 21/015 482/115 |

FOREIGN PATENT DOCUMENTS

| | | |
|---|---|---|
| CN | 212363511 U | 1/2021 |
| JP | H11171404 A | 6/1999 |
| WO | 2023284757 A1 | 1/2023 |

* cited by examiner

*Primary Examiner* — Andrew M Kobylarz

(57) ABSTRACT

A rotating resistance device, including a main shaft and a damping assembly; a rotating wheel is mounted on the main shaft; a damping wheel is rotatably arranged, and a surface of the fixed disc is cooperated with the damping wheel; a damping adhesive is arranged between the damping wheel and the surface of the fixed disc; a scraping component is provided on the damping wheel; the rotating wheel is connected to the damping assembly and configured to adjust a number of the damping units linked to the rotating wheel. The adjustment of the resistance value follows a stepwise change, and the adjustment precision is very high, allowing for precise tuning to the desired resistance value based on actual needs. Moreover, after long-term use, the resistance value remains largely stable without significant degradation, and there is no thermal fatigue, eliminating the need for heat dissipation.

9 Claims, 5 Drawing Sheets

ROTATING RESISTANCE DEVICE AND A TENSION DEVICE

CROSS REFERENCE TO RELATED APPLICATIONS

This application claims foreign priority of Chinese Patent Application No. 202411948224.5, filed on Dec. 26, 2024 in the China National Intellectual Property Administration, the disclosures of all of which are hereby incorporated by reference.

TECHNICAL FIELD

The present disclosure relates to the technical field of resistance device, in particular to a rotating resistance device and a tension device.

BACKGROUND

The resistance devices are widely used, for example, in fitness equipment such as tension devices, where users need to overcome a certain amount of pulling force for strength training. Existing tension devices mainly generate resistance through friction and electromagnetic forces. Tension devices utilizing frictional forces typically include a housing, a rotating shaft, a winding storage wheel, an elastic energy storage component, and a resistance mechanism. The rotating shaft is rotatably set within the housing, and the winding storage wheel is mounted on the rotating shaft via a unidirectional bearing. The elastic energy storage component drives the winding storage wheel to rotate relative to the rotating shaft, thereby winding the tension band onto the storage wheel. The resistance mechanism includes a resistance wheel and a friction plate. The resistance wheel is fixedly mounted on the rotating shaft, and the friction plate is in frictional contact with the outer peripheral surface of the resistance wheel. During exercise, the friction between the resistance wheel and the friction plate generates a large amount of heat. If this heat is not dissipated in time, it may affect the service life of the product. Over time, wear and tear can also lead to inaccurate resistance adjustment.

Resistance devices utilizing electromagnetic forces require components such as a rotor, stator, and circuit board, making them expensive and structurally complex. Additionally, the resistance level is related to the specifications of the rotor and stator. For smaller-sized resistance devices, it is difficult to adjust the resistance to very high levels, which highlights the shortcomings of existing technologies.

To address the issues of inaccurate resistance adjustment, complex structure, high cost, and low stability in the prior art, the present disclosure provides a rotating resistance device.

SUMMARY

In order to solve the problem of low precise of resistance adjustment, complex structure, high cost, and low stability, the present disclosure provides a rotating resistance device, comprising a main shaft and a damping assembly; wherein a rotating wheel is mounted on the main shaft; the damping assembly comprises a multiple of damping units; each damping unit comprises a damping wheel and a fixed disc; wherein the damping wheel is rotatably arranged, and a surface of the fixed disc is cooperated with the damping wheel; and a damping adhesive is arranged between the damping wheel and the surface of the fixed disc; and a scraping component is provided on the damping wheel, the scraping component is configured to paint the damping adhesive to the surface of the fixed disc; the rotating wheel is connected to the damping assembly through a linkage component, the linkage component is configured to adjust a number of the damping units linked to the rotating wheel.

Furthermore, the scraping component comprises outer scraping bars and inner scraping bars; and the outer scraping bars is configured to drive the damping adhesive towards the inner scraping bars, and the inner scraping bars is configured to drives the damping adhesive towards the outer scraping bars.

Furthermore, the inner scraping bars are located around the a center of the damping wheel, the outer scraping bars are distributed near a circumference of the damping wheel; and the outer scraping bars and the inner scraping bars are partially overlap in a circumferential direction of the damping wheel.

Furthermore, an annular cavity for is defined between the surface of the fixed disc and a side surface of the damping wheel, and the annular cavity is configured to accommodate the damping adhesive.

Furthermore, the linkage component comprises a driving wheel and a coupled wheel; wherein the driving wheel is connected to the rotating wheel; and the coupled wheel is mounted through an axial moving component, and the coupled wheel is connected to the driving wheel.

Furthermore, the axial moving component comprises a sliding block, which is mounted through a guiding component, and the coupled wheel is rotatably mounted on the sliding block.

Furthermore, the guiding component is a guiding shaft, and the sliding block is slidably mounted on the guiding shaft; and the linkage component further comprises a pushing component, the pushing component is configured to adjust a position of the sliding block on the guiding component.

Furthermore, the linkage component further comprises the driving wheel connected to the rotating wheel, with the coupled wheel remaining connected to the driving wheel; and the rotating wheel and the driving wheel are connected by a unidirectional transmission component.

Furthermore, the main shaft, the rotating wheel, the driving wheel, and the damping assembly are all arranged within a housing, and the rotating wheel is connected to an inner side of the housing by an elastic return-reset component.

The present disclosure also provides a tension device, comprising the rotating resistance device mention above.

The rotating wheel in the present disclosure drives the damping wheel to rotate through an adjustable linkage component. The scraping component group then scrapes the damping adhesive on the corresponding disk surface to generate resistance. By adjusting the number of damping wheels linked to the rotating wheel, the rotational resistance of the rotating wheel can be controlled. The resistance value adjusts in discrete steps, with very high precision, allowing for very accurate adjustment to the desired resistance based on actual needs. Furthermore, after long-term use, the resistance value remains largely stable, with no significant degradation, and there is no thermal fatigue, eliminating the need for heat dissipation. This design achieves long-term stability of use while maintaining a simple structure and low cost.

DESCRIPTION OF THE REFERENCE NUMERAL

1 housing, 2 main shaft, 3 rotating wheel, 4 fixed disc, 5 damping wheel, 6 scraping component, 7 coil spring, 8 driving wheel, 9 coupled wheel, 10 sliding block, 11 lead screw, 12 ratchet, 13 ratchet teeth, 14 groove, 15 first convex ring, 16 second convex ring, 17 annular cavity, 18 guide shaft, 19 transmission gear, 20 adjusting knob.

DETAILED DESCRIPTION OF THE EMBODIMENTS

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

As shown in FIGS. 1 to 9, the present disclosure provides a rotating resistance device.

Figure 1:
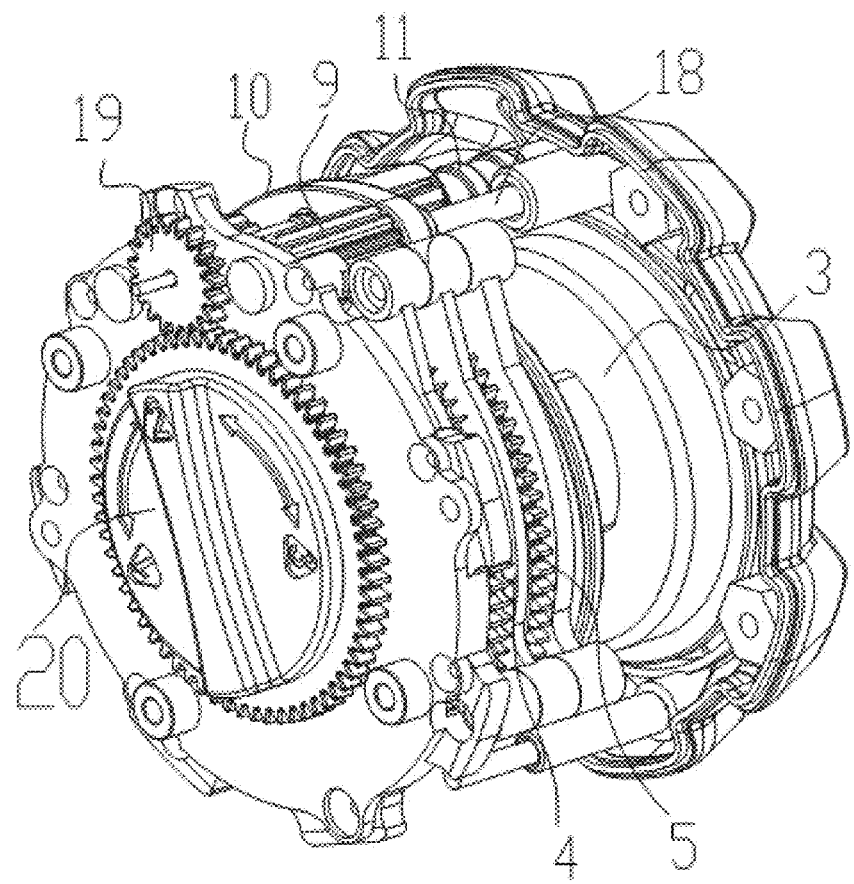
FIG. 1 is a schematic structural diagram of a rotating resistance device with a housing removed of the present disclosure.
Figure 2:
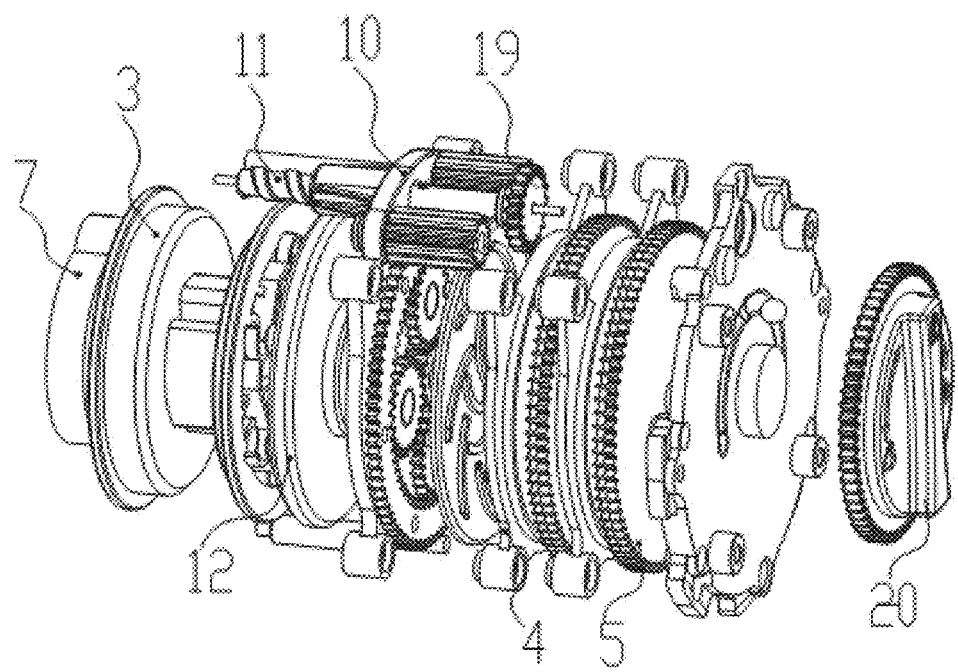
FIG. 2 is a first exploded view of the rotating resistance device with the housing removed of the present disclosure.
Figure 3:
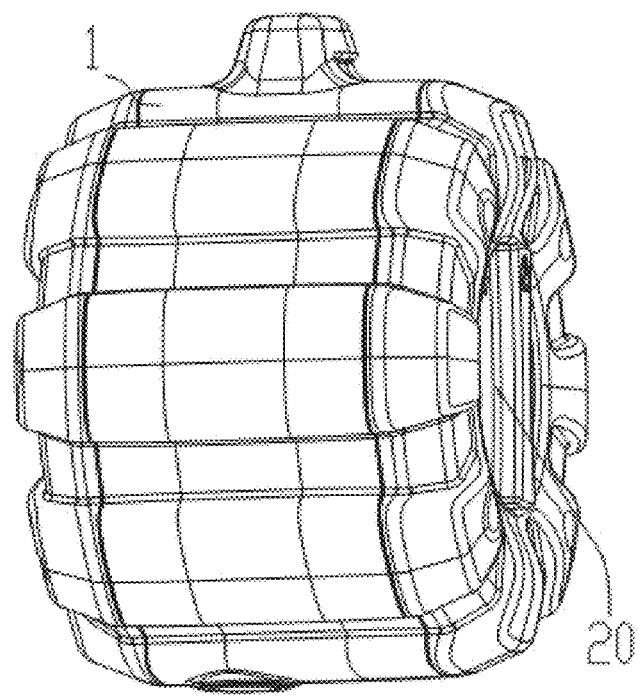
FIG. 3 is a schematic structural diagram of the rotating resistance device with a housing of the present disclosure.
Figure 4:
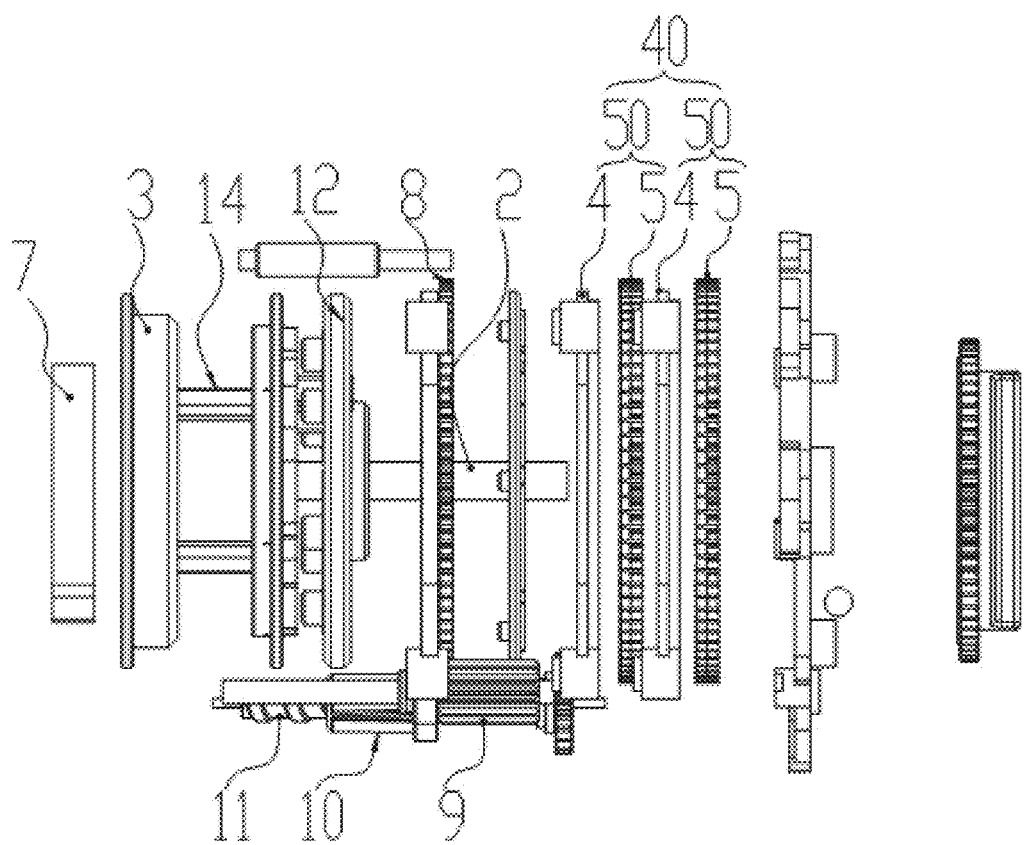
FIG. 4 is the second exploded view of the rotating resistance device with the housing removed of the present disclosure.
Figure 5:
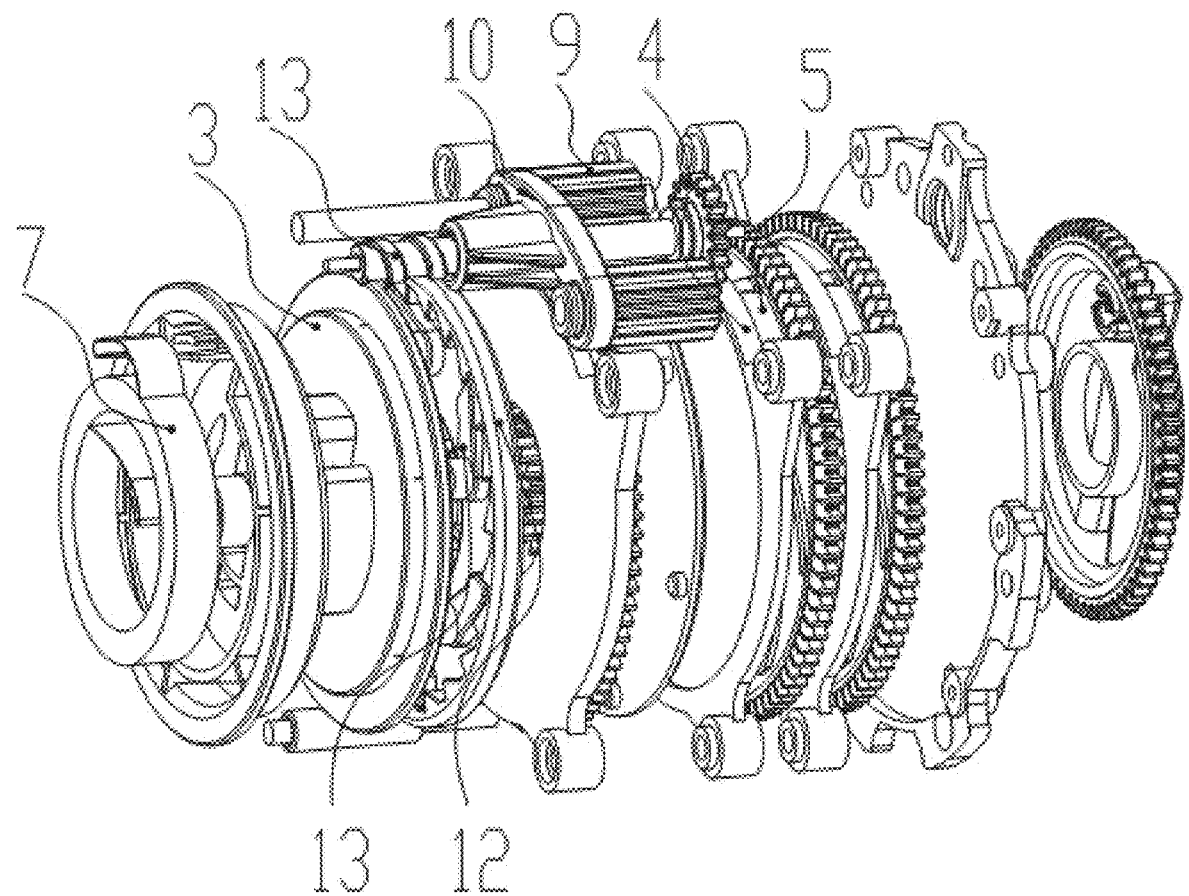
FIG. 5 is the third exploded view of the rotating resistance device with the housing removed of the present disclosure.
Figure 6:
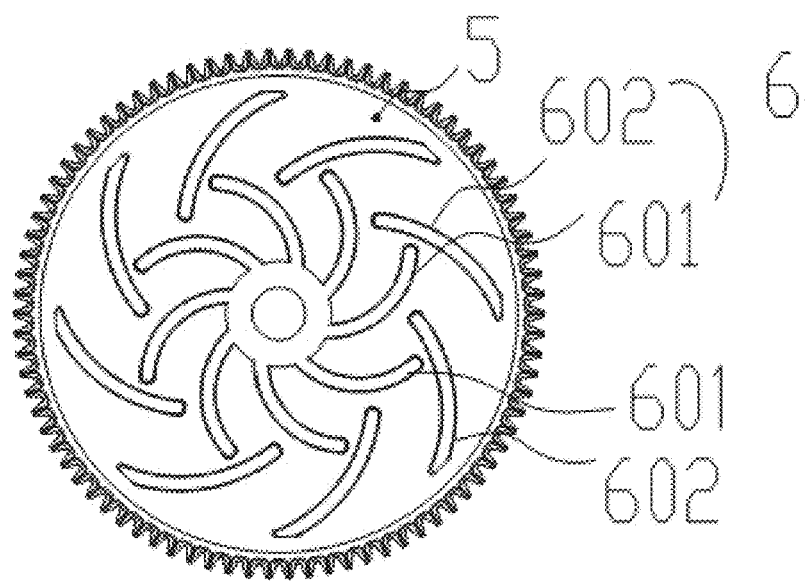
FIG. 6 is a schematic structural diagram of a damping wheel of the rotating resistance device of the present disclosure.
Figure 7:
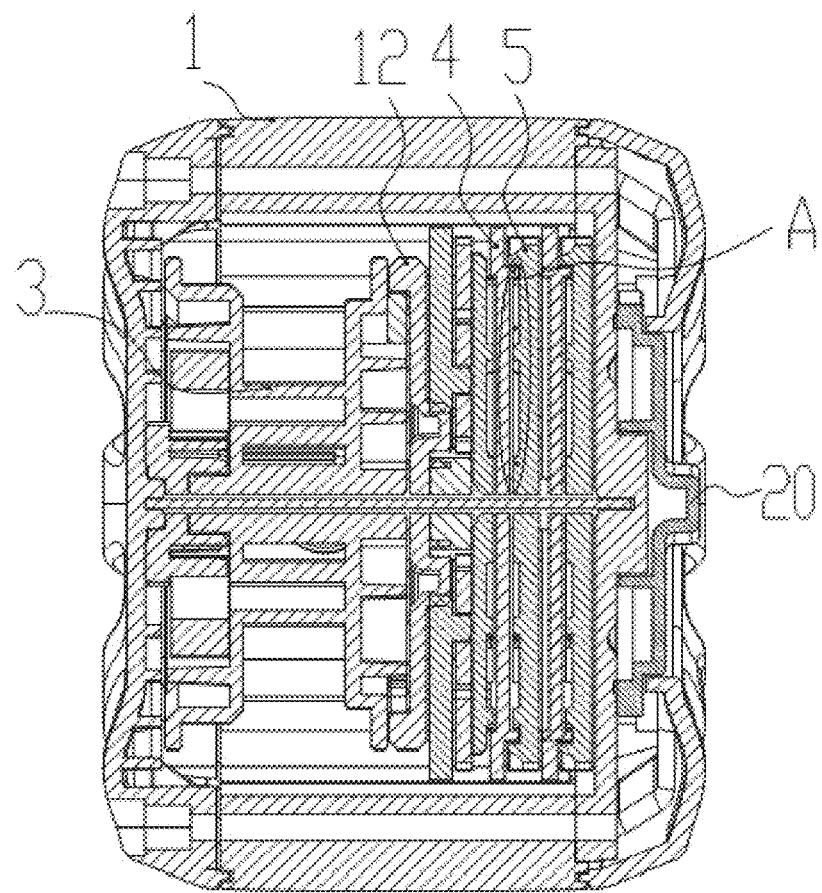
FIG. 7 is a cross-sectional structure diagram of the cross-sectional structure of the rotating resistance device with the housing removed of the present disclosure.
Figure 8:
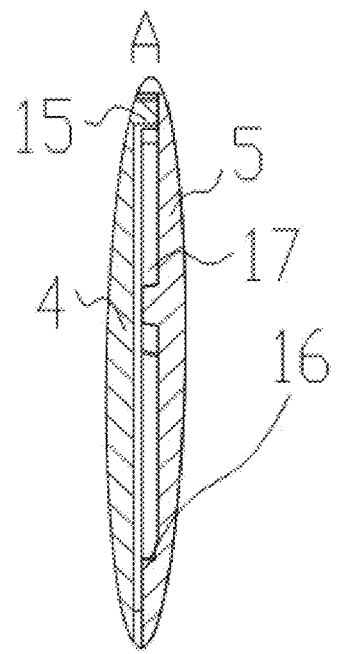
FIG. 8 is an enlarged view of area A of FIG. 7.
Figure 9:
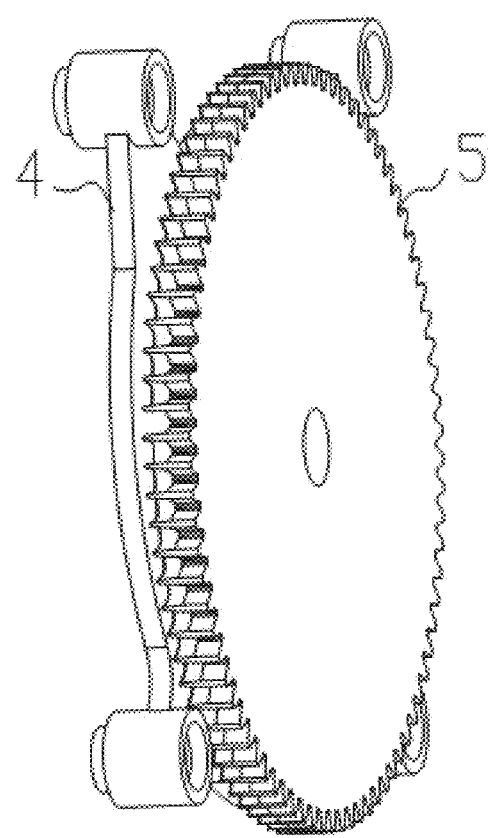
FIG. 9 is a schematic structural diagram of the damping wheel and the fixed disc of the rotating resistance device of the present disclosure.

In this embodiment, the rotating resistance device includes a housing, and a main shaft 2 is provided inside the housing 1. A rotating wheel 3 is mounted on the main shaft 2. A damping assembly 40 is installed on the main shaft 2. The damping assembly 40 is composed of several set of damping units 50 connected in series. Each damping unit includes a damping wheel 5 and a fixed disc 4. As shown in FIG. 4, there are two set of damping units 50, with two fixed discs 4 and two damping wheels 5.

The fixed disc 4 is fixed inside the housing 1, and the damping wheel 5 is sleeved on the main shaft 2. A scraping component (6) is integrally mounted on a surface of the damping wheel, and the scraping component 6 is faced to the surface of the fixed disk 4. The scraping component 6 is annularly distributed on the surface of the damping wheel (5). The damping adhesive is applied to the surface of the fixed disk 4 at a position corresponding to the scraping component 6. When the damping wheel (5) rotates relative to the surface of the fixed disk 4, the scraping component 6 scrapes the damping adhesive on the corresponding surface of the fixed disk 4. At this point, the damping adhesive creates resistance to the rotation of the damping wheel (5).

The rotating wheel (3) is connected to the damping assembly (40) via a linkage component, which can adjust a number of damping wheels (5) that are linked to the rotating wheel (3). Thus allowing the resistance value during the rotation of the rotating wheel (3) to be adjusted. The more damping wheels (5) linked, the greater the resistance. A tension band (not shown in the figure) is wrapped around the rotating wheel (3), with one end of the tension band connected to the rotating wheel (3) and the other end extending from the housing (1). The user must overcome the resistance of the rotating wheel (3) by driving the free end of the tension band. This process can be used for resistance training. During the rotation of the rotating wheel (3), the resistance remains relatively stable. This process is not limited to fitness resistance training but can also be applied in high-rise escape devices and other scenarios.

The damping adhesive is preferably damping grease, which has excellent resistance stability and buffering properties. It ensures smooth, and precise movement of the components. The grease has good low-temperature properties, excellent waterproof sealing, a long service life, and its oil molecules are evenly distributed with strong adhesion and consistent damping force.

The linkage component includes a driving wheel 8 and a coupled wheel 9. And the driving wheel 8 is connected to the rotating wheel 3. The coupled wheel 9 is mounted through an axial moving component, and the coupled wheel 9 is connected to the driving wheel 8. Adjusting the position of the coupled wheel (9) along its axial direction can regulate the number of damping wheels (5) connected to it. In other words, the coupled wheel (9) can be connected to all of the damping wheels (5) simultaneously, or it can be connected to just one damping wheel (5), thereby adjusting the resistance.

The rotating wheel (3) and the driving wheel (8) are connected by an epicyclic reduction gear, which allows for a better transmission ratio. Since the damping adhesive has high viscosity and provides significant damping to the damping wheel (5), the actual rotation speed of the damping wheel (5) is relatively slow in use, which achieves the desired effect, and a reduction design is necessary.

The axial movement component includes a sliding block (10), which is mounted on the housing (1) through a guiding component. The coupled wheel (9) is rotatably mounted on the sliding block (10). By adjusting a position of the sliding block (10) on the guiding components, the number of damping wheels (5) connected to it can be adjusted.

The adjustable linkage assembly also includes a pushing component, which can push the sliding block (10) forward along the guiding components, thereby adjusting the number of damping wheels (5) connected to it.

Specifically, the guiding component is a guiding shaft (18) set inside the housing (1). The sliding block (10) is slidably mounted on the guiding shaft (18). Preferably, there are two guiding shafts (18) to ensure the stability of the sliding block's (10) installation. And two coupled wheels (9) may provided, improving the stability of the linkage.

The pushing component includes a lead screw (11) rotatably installed inside the housing (1), with the sliding block (10) having a threaded hole that engages with the lead screw (11). The lead screw (11) is threadedly connected to the sliding block (10).

The housing (1) is provided with an adjusting knob 20, which is connected to the lead screw (11). By rotating the adjusting knob 20, the lead screw (11) can be turned to adjust the position of the sliding block (10).

The adjusting knob 20 is equipped with an indicator, and the housing (1) has markings corresponding to different gear positions. By rotating the adjusting knob, the indicator aligns with the corresponding marking, thus completing the gear shift and adjusting the tension.

An outer ring of the adjusting knob is a second gear ring, and a transmission gear 19 that engages with the second gear ring is installed on the lead screw (11).

In another embodiment, both outer rings of the driving wheel (8) and the damping wheel (5) are equipped with a first gear ring, while the coupled wheel (9) is a cylindrical gear. The coupled wheel (9) can simultaneously engage with all of the first gear rings.

The rotating wheel (3) is connected to the driving wheel (8) through a unidirectional transmission component. When the rotating wheel (3) rotates in one direction, it drives the driving wheel (8) to rotate through the unidirectional transmission component. When the rotating wheel (3) reverses, the driving wheel (8) does not rotate with the rotating wheel (3).

The unidirectional transmission component includes a ratchet (12), which is connected to the driving wheel (8). The rotating wheel (3) is provided with several ratchet teeth (13) that engage with the ratchet (12). The unidirectional transmission between the rotating wheel (3) and the driving wheel (8) is achieved through the engagement of the ratchet (12) and the ratchet teeth (13). This is a conventional technology, which will not be elaborated further here. Alternatively, a unidirectional bearing or other structures that can achieve the same function may also be used.

The scraping component (6) includes several inner scraping bars 601 near the outer side of the damping wheel (5) and several outer scraping bars 602 near a center of the damping wheel (5). The inner scraping bars 601 and outer scraping bars 602 are partially overlap in the circumferential direction of the damping wheel (5). The inner scraping bars 601 have first driving surfaces that slope toward the center of the damping wheel (5) on the side facing the direction of rotation, while outer scraping bars 602 have second driving surfaces that slope toward the outer circumference of the damping wheel (5) on the side facing the direction of rotation. When the damping wheel (5) rotates, the inner scraping bars 601 use the first driving surfaces to direct the damping adhesive towards the inner circle of the surface of the fixed disk 4, while the outer scraping bars 602 use the second driving surfaces to direct the damping adhesive towards the outer circle of the surface of the fixed disk 4. This process continues as the damping wheel (5) rotates.

In another embodiment, the scraping component 6 includes an external driving part and a inward gathering component. The external driving part of the scraping component 6 is the inner scraping strip 601 near the center of the damping wheel 5. The inward gathering component is divided into the outer scraping strip 602 near the outer ring of the damping wheel 5. Both the inner and outer scraping strips are preferably designed with a certain curvature. When the damping wheel 5 rotates, the inner scraping strips 601 drives the damping adhesive towards the outer ring of the surface of the fixed disk, while the outer scraping strips 602 gather the damping adhesive towards the center of the surface of the fixed disk. As the damping wheel 5 rotates, the damping adhesive is continually driven outward and gathered inward. This process ensures that the rotation of the damping wheel 5 is consistently resisted and that the damping adhesive remains within the range of the scraping component 6 on the surface of the fixed disk, preventing the damping adhesive from moving to non-working areas far from the outer scraping strips 602.

The rotating wheel 3 is provided with a return resetting component, which is preferably a coil spring 7. One end of the coil spring 7 is fixed, and the other end is connected to the rotating wheel 3. The fixed end of the coil spring 7 can be securely connected to the inner side of the housing 1. When the rotating wheel 3 rotates, the coil spring 7 deforms, and when the rotating wheel 3 is released, the coil spring 7 will automatically return the rotating wheel 3 to its original position.

A groove 14 is arranged at the middle position of the rotating wheel 3, which can be used to install a tension band. When not in use, the tension band can be wound and stored within the groove 14, preventing the band from becoming tangled.

An annular cavity 17 is formed between the surface of the fixed disk 4 and the side surface of the damping wheel 5 to accommodate the damping adhesive. Specifically, a first convex ring 15 is set near the outer ring of the surface of the fixed disk, facing the damping wheel 5. The first convex ring 15 fits against the corresponding side surface of the damping wheel 5. The inner ring of the damping wheel 5 is equipped with a second convex ring 16 facing the surface of the fixed disk. The second convex ring 16 fits against the corresponding surface of the fixed disk 4. The first convex ring 15, the second convex ring 16, the surface of the fixed disk 4, and side surface of the damping wheel 5 together limit and form the annular cavity 17. The damping adhesive is added to the annular cavity 17, ensuring that the damping adhesive will not overflow during long-term use.

The rotational resistance device can be applied in tension devices for strength training applications.

Working principle: when this device is used as a tension device, the user pulls on the free end of the tension band, which drives the rotating wheel 3 to turn. The rotating wheel 3, through an adjustable linkage component, drives the damping wheel 5 to rotate. The scraping component 6 scrapes the damping adhesive on the corresponding surface of the fixed disk, generating resistance. By adjusting the number of damping wheels 5 linked to the rotating wheel 3, the rotational resistance of the rotating wheel 3 can be adjusted. The resistance value changes in discrete steps, with very high precision, allowing for fine adjustments to meet the user's required resistance. Moreover, after long-term use, the resistance value remains largely unaffected. This device can also be applied in other scenarios, such as large fitness equipment. For instance, when this device is placed on top of a barbell, with the free end of the tension band connected to the barbell, after the user lifts the barbell, the device will prevent the barbell from falling rapidly. This provides a protective effect, with the resistance value adjusted according to the weight of the barbell. This setup ensures stable protection. It can also be used in high-rise escape equipment. When the device is positioned high up and the user secures the free end of the tension band to their body, the resistance encountered during descent ensures a stable and safe speed of descent.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A rotating resistance device, comprising a main shaft and a damping assembly;

wherein a rotating wheel is mounted on the main shaft;

the damping assembly comprises a plurality of damping units; and each damping unit comprises a damping wheel and a fixed disc;

wherein the damping wheel is rotatably arranged, and a surface of the fixed disc is cooperated with the damping wheel; and a damping adhesive is arranged between the damping wheel and the surface of the fixed disc; and a scraping component is provided on the damping wheel, and the scraping component is configured to paint the damping adhesive to the surface of the fixed disc;

the rotating wheel is connected to the damping assembly through a linkage component, and the linkage component is configured to adjust a number of the damping units linked to the rotating wheel; and wherein the scraping component comprises outer scraping bars and inner scraping bars; and the outer scraping bars are configured to drive the damping adhesive towards the inner scraping bars, and the inner scraping bars are configured to drive the damping adhesive towards the outer scraping bars.

2. The rotating resistance device according to claim 1, wherein the linkage component comprises a driving wheel and a coupled wheel;

wherein the driving wheel is connected to the rotating wheel; and the coupled wheel is mounted through an axial moving component, and the coupled wheel is connected to the driving wheel.

3. The rotating resistance device according to claim 2, wherein the axial moving component comprises a sliding block, which is mounted through a guiding component, and the coupled wheel is rotatably mounted on the sliding block.

4. The rotating resistance device according to claim 3, wherein the guiding component is a guiding shaft, and the sliding block is slidably mounted on the guiding shaft; and the linkage component further comprises a pushing component, and the pushing component is configured to adjust a position of the sliding block on the guiding component.

5. The rotating resistance device according to claim 2, wherein the rotating wheel and the driving wheel are connected by a unidirectional transmission component.

6. The rotating resistance device according to claim 5, wherein the main shaft, the rotating wheel, the driving wheel, and the damping assembly are all arranged within a housing, and the rotating wheel is connected to an inner side of the housing by an elastic return-reset component.

7. The rotating resistance device according to claim 1, wherein the inner scraping bars are located around a center of the damping wheel, the outer scraping bars are distributed near a circumference of the damping wheel; and the outer scraping bars and the inner scraping bars partially overlap in a circumferential direction of the damping wheel.

8. The rotating resistance device according to claim 1, wherein an annular cavity fer is defined between the surface of the fixed disc and a side surface of the damping wheel, and the annular cavity is configured to accommodate the damping adhesive.

9. A tension device, comprising a rotating resistance device, wherein the rotating resistance device comprises a main shaft and a damping assembly;

wherein a rotating wheel is mounted on the main shaft;

the damping assembly comprises a plurality of damping units; and each damping unit comprises a damping wheel and a fixed disc;

wherein the damping wheel is rotatably arranged, and a surface of the fixed disc is cooperated with the damping wheel; and a damping adhesive is arranged between the damping wheel and the surface of the fixed disc; and a scraping component is provided on the damping wheel, and the scraping component is configured to paint the damping adhesive to the surface of the fixed disc;

the rotating wheel is connected to the damping assembly through a linkage component, and the linkage component is configured to adjust a number of the damping units linked to the rotating wheel; and wherein the scraping component comprises outer scraping bars and inner scraping bars; and the outer scraping bars are configured to drive the damping adhesive towards the inner scraping bars, and the inner scraping bars are configured to drive the damping adhesive towards the outer scraping bars.

* * * * *